Patented Apr. 15, 1947

2,418,920

UNITED STATES PATENT OFFICE 2,418,920

PROCESS OF DISPERSING OIL GELS

Henry G. Berger, George S. Crandall, and John F. Socolofsky, Woodbury, N. J., assignors to Socony-Vacuum Oil Company, Incorporated, New York, N. Y., a corporation of New York No Drawing. Application March 17, 1942, Serial No. 435,080

15 Claims. (Cl. 106—250)

This invention is concerned with the preparation of varnishes and other bodied drying oil products and with the novel compositions of matter produced by the technique herein disclosed. More particularly, the invention relates to incorporation of preformed drying oil gels in drying oils and the like.

Heretofore, varnishes and the like, of high quality, have been prepared almost exclusively from a relatively few drying oils, primarily the "hard" oils such as China-wood oil and perilla oil. These oils may be bodied readily, and dry to form superior films. China-wood oil, perilla oil and others have, however, been difficult to obtain and expensive under the most favorable commercial circumstances and are, due to war conditions, now rapidly approaching a state of exhaustion insofar as this country is concerned. "Synthetic substitutes" have been proposed. For example, it is possible to dehydrate castor oil to produce conjugated di-olefins. Another type of alternative is exemplified by saponification of relatively cheap oils such as fish oils, separation of free acids by fractional distillation and re-esterification of selected cuts.

We have now developed a quick-bodying oil at least as valuable as China-wood oil for formation of films, using oils readily available from sources in continental United States and South America. Whereas prior art practices have stressed avoidance of gel formation during the cooking of drying oils to the desired body, we have found that superior results are obtained by incorporating a preformed gel derived from drying oil with the oil to be bodied. By this expedient, we avoid the precautionary measures necessary to prevent gelation of the oil being bodied and allow the use of temperatures and/or cooking times which would have a deleterious effect on the drying and film-forming properties of the finished product if it were made from China-wood or oiticica oils by conventional methods.

According to our process, the main body of the oil is not polymerized to the stage at which it has the desired body for the final product. Instead, a portion of the oil is subjected to extensive polymerization to form a gel which is then dispersed in an unbodied oil to form a quick bodying oil. The gel for incorporation in the oil to be bodied may be prepared by thermal treatment alone or by catalysis or a combination of the two. Where a catalyst is used, a polymerization catalyst, such as boron fluoride, is uniformly mixed with the raw oil and the mass reacted at moderate temperature until the whole is converted to a gel.

The gel, regardless of the mode of formation, resembles the "art gum" of commerce in many respects, is translucent in relatively thin layers and shows a characteristic gel-type fracture. The mass of gel is broken into small pieces, preferably finely divided as by passing through a roller mill. The milled product strongly resembles the crumbs obtained by erasing with art gum and has a relatively high capacity to absorb oxygen. This latter property renders it desirable to use the milled product promptly since it tends to become hard and less soluble in drying oils after taking up oxygen. It may also take up oxygen so rapidly as to burst into flame and precaution against fire must be taken if the milled gel is stored.

The gel is incorporated in a mass of untreated drying oil and the mixture heated until the gel is uniformly dispersed. Prepared in this manner, the oil may be employed in any of the known uses for bodying oils, for example, conversion to varnish by cooking with suitable resins. It is also feasible to add resins before the step of heating to disperse the gel and thus complete the varnish-making in one step.

Our process finds particular application in the preparation of bodied oils and varnishes from the slower drying oils and semi-drying oils such as linseed oil and soya bean oil. The advantages of a process which permits the replacement of an active drying oil (e. g. tung oil) in whole or in part by a less active and more readily available oil are obvious. We have prepared ester gum varnishes from our products, which compare very favorably with a commercial tung oil-ester gum varnish prepared by conventional means. Typical results are shown in a table set out hereinafter. It is notable that ester gum varnishes made from oil mixtures consisting of the same proportions of linseed oil and oiticica oil (ungelled) are not satisfactory varnishes.

We have used dispersion agents to assist the dispersion of the gel in the oil in some of our tests (pyridine, quinoline, iso-quinoline and heterocyclic organic nitrogen compounds, in general, have been used with considerable success). However, in general, we have found them to be unnecessary if the gel is properly prepared and is ground sufficiently fine. In general, temperatures on the order of 560° to 580° F. during a relatively short period are desirable to give satisfactory compositions without the use of dispersing agents when the gel is finely ground. When a dispersing agent is used, lower temperatures of about 520° F. to 550° F. are sufficient. In the latter case, milling of the gel is unnecessary since small lumps may be readily dispersed.

During the step of heating the mixture of gel and unbodied oil to produce a bodied oil composition, it is noted that heat is apparently evolved during the latter part of the cooking operation. We have prepared varnish bases using cooking periods of 45 minutes to 3 hours at various temperatures and noted clear evidence of exothermic reaction about 20 minutes before the end of that operation regardless of total cooking time.

EXAMPLE I

Oiticica oil was gelled by the addition of 0.1% boron fluoride and heating for 5 to 10 minutes. This product is a solid resembling art gum. A mixture of 50 parts of this gel and 150 parts of raw linseed oil were mixed in a Waring Blendor. To this gel-oil was added 100 parts ester gum and 0.4 part of iso-quinoline. This entire charge (50 parts oiticica gel, 150 parts linseed oil, 100 parts ester gum and 0.4 part iso-quinoline) was then heated with stirring for 95 minutes at 560° F. This varnish base was cooled to 400° F. and thinned by the addition of 450 parts petroleum thinner and driers containing 1.5 parts lead, 0.105 part manganese and 0.15 part cobalt. The resulting varnish had a body of G— (Gardner-Holdt) at 40% non-volatile, and dried dust-free in 1¼ hours, tack free in 4½ hours, and hard overnight. The film was of normal hardness and had good water resistance.

EXAMPLE II

Oiticica oil gel was prepared as in Example I. The gel was then ground on a roller mill. This form of the gel is referred to as "milled" gel. Linseed oil 100 parts, ester gum 100 parts and "milled" oiticica oil gel 100 parts were heated with stirring for 135 minutes at 560° F. This varnish base was then cooled to 400° F. and to it was added 352 parts of petroleum thinner and driers containing 1.5 parts lead, 0.105 part manganese and 0.15 part cobalt. The resulting varnish had a body of C (Gardner-Holdt) at 46% non-volatile, and dried dust-free in 1¼ hours, tack free in 5 hours, and hard overnight. The film was of normal hardness and had good water resistance.

EXAMPLE III

Milled oiticica gel (prepared as in Example II) 20 parts, ester gum 100 parts and linseed oil 180 parts were heated with agitation for 210 minutes at 530° F. This varnish base was then cooled to 400° F. and to it was added 157 parts of petroleum thinner and driers containing 1 part lead, 0.70 part manganese and 0.1 part cobalt. The resulting varnish had a body of B— (Gardner-Holdt) at 56% non-volatile, and dried dust-free in 2 hours, tack free in 6 hours, and hard overnight. Film hardness was normal, water resistance good and the varnish was non-reactive in zinc test.

EXAMPLE IV

A varnish consisting of linseed oil 180 parts, oiticica oil 20 parts and ester gum 150 parts was prepared by conventional cooking means with a cooking time of 240 minutes at 590° F. The varnish base was reduced to 55% non-volatile with thinners and driers to contain 1 part lead, 0.70 part manganese and 0.1 part cobalt. This varnish had a body of B+ and required 2½ hours to become dust free and was not tack free in 4 days.

The above examples are exemplary only as will be readily understood by those skilled in the art. Gels derived from various drying and semi-drying oils may be dispersed in drying and semi-drying oils of the same or different nature to produce superior bodied drying oil compositions. For example, we have dispersed gels in soya bean oil and oiticica oil with excellent results. The relative proportions of gel and unbodied oil may be varied widely, depending upon the type of product desired.

We include herewith a table of atmospheric exposure tests comparing ester gum varnishes prepared according to our procedure with previously known commercial varnishes as indicated.

TABLE I

*Atmospheric exposure tests*

| Description of Varnish | | Condition After Exposure For— | | | |
|---|---|---|---|---|---|
| | | 6 Wks. | 9 Wks. | 13 Wks. | 17 Wks. |
| *Conventional Type Varnishes* | | | | | |
| Heat Bodied Oiticica Oil Ester Gum (25 gal.) | | Failed | | | |
| Commerical 25 gal. China-Wood Oil—Ester Gum Varnish | | O. K. | Failed | | |
| Commerical 25 gal. China-Wood Oil—Perilla Oil—Bakelite Varnish. | | O. K. | O. K. | O. K. | Failing. |
| Commercial 25 gal. China-Wood Oil—Bakelite Varnish | | O. K. | O. K. | O. K. | O. K. |
| *New Type Varnishes* | | | | | |
| Oil Composition | Resin | | | | |
| Oiticica Gel, 100 parts; Oiticica Oil, 100 parts. | Ester Gum, 100 parts | O. K. | Failed | | |
| Oiticica Gel, 100 parts; Linseed Oil, 100 parts. | Ester Gum, 100 parts | O. K. | O. K. | Failed | |
| Oiticica Gel, 100 parts; Soya bean Oil, 100 parts. | Ester Gum, 100 parts | O. K. | O. K. | do | |
| Oiticica Gel, 50 parts; Linseed Oil, 150 parts. | Ester Gum, 100 parts | O. K. | O. K. | O. K. | O. K. |
| Oiticica Gel, 100 parts; Linseed Oil, 200 parts. | Ester Gum, 100 parts | O. K. | O. K. | O. K. | O. K. |
| Oiticica Gel, 100 parts; Soya bean Oil 100 parts. | Bakelite, 100 parts | O. K. | O. K. | O. K. | O. K. |

Three general types of commercial products within the scope of the invention can be recognized.

1. The unbodied oil produced by incorporating gel into linseed oil with the minimum amount of heat required to produce a clear homogeneous oil. (This oil could be sold as such to varnish makers.)

2. The above oil bodied by heat treatment. (This oil could be used in undercoaters and enamels as such.)

3. Varnishes produced from either the bodied or unbodied oil by incorporation of varnish resins before and/or after bodying of the oil.

We claim:

1. The process which comprises dispersing a gel of an oil of the class consisting of drying and semi-drying oils in an oil of said class with the aid of a small amount of a heterocyclic organic nitrogen compound as a dispersing agent.

2. The process which comprises dispersing a gel of an oil of the class consisting of drying and semi-drying in an oil of said class with the aid of a small amount of isoquinoline.

3. The process which comprises dispersing a gel of an oil of the class consisting of drying and semi-drying in an oil of said class with the aid of a small amount of quinoline.

4. The process which comprises dispersing a gel of an oil of the class consisting of drying and semi-drying in an oil of said class with the aid of a small amount of pyridine.

5. The process which comprises dispersing a gel of oiticica oil in linseed oil with the aid of a small amount of iso-quinoline and heating the resultant mass.

6. The process which comprises dispersing a gel of oiticica oil in linseed oil with the aid of a small amount of iso-quinoline, adding a varnish resin, and heating the resultant mass.

7. The process which comprises dispersing gelled oiticica oil in linseed oil with the aid of a heterocyclic organic nitrogen compound.

8. The process which comprises gelling a drying oil in the presence of a polymerization catalyst and dispersing the gel so formed in an oil of the class consisting of drying and semi-drying oils with the aid of a small amount of a heterocyclic nitrogen compound as a dispersing agent.

9. The process which comprises gelling oiticica oil in the presence of a polymerization catalyst and dispersing the gel so formed in an oil of the class consisting of drying and semi-drying oils with the aid of a small amount of a heterocyclic nitrogen compound as a dispersing agent.

10. The process which comprises gelling a drying oil in the presence of boron trifluoride and dispersing the gel so formed in an oil of the class consisting of drying and semi-drying oils with the aid of a small amount of a heterocyclic nitrogen compound as a dispersing agent.

11. The process which comprises gelling oiticica oil in the presence of boron trifluoride and dispersing the gel so formed in an oil of the class consisting of drying and semi-drying oils with the aid of a small amount of a heterocyclic nitrogen compound as a dispersing agent.

12. The process which comprises gelling a drying oil in the presence of a polymerization catalyst and dispersing the gel so formed in linseed oil with the aid of a small amount of a heterocyclic nitrogen compound as a dispersing agent.

13. The process which comprises gelling oiticica oil in the presence of a polymerization catalyst and dispersing the gel so formed in linseed oil with the aid of a small amount of a heterocyclic nitrogen compound as a dispersing agent.

14. The process which comprises gelling a drying oil in the presence of boron trifluoride and dispersing the gel so formed in linseed oil with the aid of a small amount of a heterocyclic nitrogen compound as a dispersing agent.

15. The process which comprises gelling oiticica oil in the presence of boron trifluoride and dispersing the gel so formed in linseed oil with the aid of a small amount of a heterocyclic nitrogen compound as a dispersing agent.

HENRY G. BERGER.
GEORGE S. CRANDALL.
JOHN F. SOCOLOFSKY.

REFERENCES CITED

The following references are of record in the file of this patent:

UNITED STATES PATENTS

| Number | Name | Date |
| --- | --- | --- |
| 1,791,119 | Cabot | Feb. 3, 1931 |
| 1,459,581 | Draper | June 19, 1923 |
| 2,260,880 | Bartlett | Oct. 28, 1941 |
| 2,224,237 | Spitzli | Dec. 10, 1940 |
| 2,271,804 | Root | Feb. 3, 1942 |
| 2,113,358 | Reece | Apr. 10, 1927 |
| 2,041,836 | Hunt | May 26, 1936 |
| 1,864,941 | Rieman | June 28, 1932 |
| 2,195,549 | Wasson | Apr. 2, 1940 |

FOREIGN PATENTS

| Number | Country | Date |
| --- | --- | --- |
| 250,538 | British | May 10, 1927 |
| 341,431 | British | Jan. 8, 1931 |

OTHER REFERENCES

Pages 2044, 2142, 2320, 2321, 2322, and 2325 of part I of vol. 2 of the book entitled "Patents, Technology and Bibliography of China-Wood Oil," by Stevens and Armitage (1914). (A copy in Div. 64 of the U. S. Patent Office.)